(12) United States Patent
Tabata

(10) Patent No.: US 11,796,308 B2
(45) Date of Patent: Oct. 24, 2023

(54) THREE-DIMENSIONAL MEASURING APPARATUS, THREE-DIMENSIONAL MEASURING METHOD

(71) Applicant: YAMAHA HATSUDOKI KABUSHIKI KAISHA, Iwata (JP)

(72) Inventor: Nobuaki Tabata, Iwata (JP)

(73) Assignee: YAMAHA HATSUDOKI KABUSHIKI KAISHA, Iwata (JP)

( * ) Notice: Subject to any disclaimer, the term of this patent is extended or adjusted under 35 U.S.C. 154(b) by 283 days.

(21) Appl. No.: 17/270,840

(22) PCT Filed: Aug. 24, 2018

(86) PCT No.: PCT/JP2018/031331
§ 371 (c)(1),
(2) Date: Feb. 23, 2021

(87) PCT Pub. No.: WO2020/039575
PCT Pub. Date: Feb. 27, 2020

(65) Prior Publication Data
US 2021/0310791 A1 Oct. 7, 2021

(51) Int. Cl.
*G01B 11/00* (2006.01)
*G01B 11/25* (2006.01)

(52) U.S. Cl.
CPC .......... *G01B 11/002* (2013.01); *G01B 11/25* (2013.01)

(58) Field of Classification Search
CPC ... G01B 11/002; G01B 11/25; G01B 11/2527; G01B 11/2509; G01B 11/2513; G01B 2210/56; H05K 3/34
(Continued)

(56) References Cited

U.S. PATENT DOCUMENTS

2012/0194647 A1* 8/2012 Tomaru .............. G01B 11/2527
348/46

FOREIGN PATENT DOCUMENTS

JP 3996560 B2 10/2007
JP 4256059 B2 4/2009
(Continued)

OTHER PUBLICATIONS

A translation of JP 2017173259 which the original copy is submitted by IDS (Year: 2017).*
(Continued)

*Primary Examiner* — Sunghee Y Gray
(74) *Attorney, Agent, or Firm* — Studebaker & Brackett PC

(57) ABSTRACT

The imaging camera includes the high-sensitivity pixel with the spectral sensitivity characteristic having high sensitivity to a light of the wavelength to be irradiated to the solder (target), and the low-sensitivity pixel with the spectral sensitivity characteristic having low sensitivity to this light. This allows the pattern light reflected in the high-reflection area of the surface of the solder to be converted to an appropriate pixel value using the low-sensitivity pixel, while allowing the pattern light reflected in the low-reflection area of the surface of the solder to be converted to an appropriate pixel value using the high-sensitivity pixel. Namely, both the pattern lights reflected in the high-reflection area and the low-sensitivity pixel can be converted to appropriate pixel values. In this way, even if the solder has both the high-reflection area and the low-sensitivity pixel, acquisition of accurate pixel values is allowed for both of these areas.

7 Claims, 8 Drawing Sheets

(58) Field of Classification Search
USPC ......................................................... 356/614
See application file for complete search history.

(56) References Cited

FOREIGN PATENT DOCUMENTS

| JP | 2014-119442 A | | 6/2014 |
|---|---|---|---|
| JP | 2015-068654 A | | 4/2015 |
| JP | 2015132509 A | * | 7/2015 |
| JP | 2017-173259 A | | 9/2017 |

OTHER PUBLICATIONS

A translation of JP 2015132509 (Year: 2015).*
International Search Report issued in PCT/JP2018/031331; dated Nov. 20, 2018.
Office Action issued in KR 10-2021-7004969; mailed by the Korean Intellectual Property Office dated Sep. 12, 2022.

* cited by examiner

THREE-DIMENSIONAL MEASURING APPARATUS, THREE-DIMENSIONAL MEASURING METHOD

This application is a National Stage of International Patent Application No. PCT/JP2018/031331, filed Aug. 24, 2018, the entire contents of which is incorporated herein by reference.

BACKGROUND

Technical Field

The present disclosure relates to a technique of measuring the three-dimensional shape of a target.

Background Art

JP4256059 discloses a three-dimensional measuring apparatus which measures the three-dimensional shape of a target such as solder printed on an electrode on a printed board. This three-dimensional measuring apparatus applies white light to the target, and measures the three-dimensional shape of the target on the basis of an image resulting from imaging of light reflected on the target. In this three-dimensional measuring apparatus, the light reflected on the target can be imaged using an imaging camera which has a plurality of pixels to output respective pixel values responsive to the intensities of entering light.

SUMMARY

Each pixel of the imaging camera has a dynamic range and is incapable of outputting an accurate pixel value in response to light darker or brighter than the dynamic range. This may be handled by a technique of increasing the intensity of light to be applied to the target if the reflectivity of the target is low, and reducing the intensity of light to be applied to the target if the reflectivity of the target is high. If the target has both a low-reflectivity area and a high-reflectivity area, however, increasing the intensity of light makes it impossible to acquire an accurate pixel value for the high-reflectivity area, and reducing the intensity of light makes it impossible to acquire an accurate pixel value for the low-reflectivity area. For this reason, this technique has not always been used effectively.

The present disclosure has been made in view of the foregoing, and is intended to provide a technique allowing acquisition of accurate pixel values for both of a low-reflectivity area and a high-reflectivity area even if both of these areas exist in a target.

A three-dimensional measuring apparatus according to the disclosure comprises a projector that irradiates a light of a predetermined wavelength to a target; an imaging camera having a plurality of pixels to which a light reflected on the target is incident, each of the pixels outputting a pixel value corresponding to the intensity of the light incident; and a controller that performs shape calculation of a three-dimensional shape of the target on the basis of the pixel value. The pixels include a plurality of high-sensitivity pixels and a plurality of low-sensitivity pixels having a spectral sensitivity characteristic having a lower ratio of output to input of the predetermined wavelength than a spectral sensitivity characteristic of the high-sensitivity pixels.

A three-dimensional measuring method according to the disclosure comprises a step of irradiating a light of a predetermined wavelength to a target; a step of causing a light reflected on the target to be incident to a plurality of pixels and causing each of the pixels to output a pixel value corresponding to the intensity of the light incident; and a step of performing shape calculation of the three-dimensional shape of the target on the basis of the pixel value. The pixels include a plurality of high-sensitivity pixels and a plurality of low-sensitivity pixels having a spectral sensitivity characteristic having a lower ratio of output to input of the predetermined wavelength than a spectral sensitivity characteristic of the high-sensitivity pixels.

According to the disclosure having the foregoing configurations (three-dimensional measuring apparatus and three-dimensional measuring method), the imaging camera includes the high-sensitivity pixels and the low-sensitivity pixels having a spectral sensitivity characteristic having a lower ratio of output to input of the predetermined wavelength than a spectral sensitivity characteristic of the high-sensitivity pixels. Namely, the imaging camera includes the high-sensitivity pixels with the spectral sensitivity characteristic having high sensitivity to a light of the predetermined wavelength to be irradiated to the target, and the low-sensitivity pixels with the spectral sensitivity characteristic having lower sensitivity to this light than the high-sensitivity pixels. This allows a light reflected in a high-reflectivity area of the target to be converted to an appropriate pixel value using the low-sensitivity pixel, while allowing a light reflected in a low-reflectivity area of the target to be converted to an appropriate pixel value using the high-sensitivity pixel. Namely, both the light reflected in the high-reflectivity area and the light reflected in the low-reflectivity area can be converted to appropriate pixel values. In this way, even if the target has both the low-reflectivity area and the high-reflectivity area, acquisition of accurate pixel values is allowed for both of these areas.

The three-dimensional measuring apparatus may by configured so that the high-sensitivity pixels and the low-sensitivity pixels are arranged alternately. In this configuration, the high-sensitivity pixels and the low-sensitivity pixels are arranged uniformly while adjoining each other. This allows a light reflected with high reflectivity to be captured correctly using the low-sensitivity pixel, while allowing a light reflected with low reflectivity to be captured correctly using the high-sensitivity pixel. As a result, even if the target has both the low-reflectivity area and the high-reflectivity area, acquisition of accurate pixel values is allowed for both of these areas.

The three-dimensional measuring apparatus may be configured so that the pixels include the high-sensitivity pixels and the low-sensitivity pixels at the same ratio. This configuration allows a light reflected in the high-reflectivity area and a light reflected in the low-reflectivity area to be converted to appropriate pixel values without causing unbalance toward one of these lights. As a result, even if the target has both the low-reflectivity area and the high-reflectivity area, acquisition of accurate pixel values is allowed for both of these areas.

The three-dimensional measuring apparatus may be configured so that the predetermined wavelength is a wavelength of green, the pixels are arranged in the Bayer arrangement in which red, green, and blue pixels are arranged in a predetermined pattern, each of the high-sensitivity pixels is the green pixel in the Bayer arrangement, and the low-sensitivity pixels include an equal number of the blue pixels and the red pixels in the Bayer arrangement. In this configuration, the green high-sensitivity pixels and the red or blue low-sensitivity pixels are arranged uniformly while adjoining each other. This allows a light reflected with high reflectivity to be captured correctly using the low-sensitivity pixel, while allowing a light reflected with low reflectivity to be captured correctly using the high-sensitivity pixel. As a result, even if the target has both the low-reflectivity area and the high-reflectivity area, acquisition of accurate pixel values is allowed for both of these areas.

It is highly likely that a pixel value resulting from conversion of a light incident to the high-sensitivity pixel after being reflected in the high-reflectivity area or a pixel value resulting from conversion of a light incident to the low-sensitivity pixel after being reflected in the low-reflectivity area will become an inappropriate value. Therefore, the three-dimensional measuring apparatus may be configured so that the controller performs a judgment process of judging whether the pixel value output from the pixel is appropriate on the basis of the pixel value for each of the pixels, and performs the shape calculation on the basis of a judgment result obtained by the judgment process. This configuration makes it possible to perform the shape calculation using an appropriate pixel value while reducing influence by an inappropriate pixel value. Thus, even if the target has both the low-reflectivity area and the high-reflectivity area, it is possible to calculate the three-dimensional shape of the target accurately.

The three-dimensional measuring apparatus may be configured so that the controller performs the shape calculation on the basis of a result of interpolation performed on the high-sensitivity pixel which has the pixel value judged to be inappropriate by the judgment process, using the pixel value of the low-sensitivity pixel existing within a predetermined range from the corresponding high-sensitivity pixel, or on the basis of a result of interpolation performed on the low-sensitivity pixel, which has the pixel value judged to be inappropriate by the judgment process, using the pixel value of the high-sensitivity pixel existing within the predetermined range from the corresponding low-sensitivity pixel. This configuration allows implementation of the shape calculation on the basis of a result of interpolation of a pixel value of a pixel judged to be inappropriate by the judgment process using a pixel value of a pixel existing within the predetermined range from the corresponding pixel. Thus, even if the target has both the low-reflectivity area and the high-reflectivity area, it is possible to calculate the three-dimensional shape of the target accurately.

The three-dimensional measuring apparatus may be configured so that the projector irradiates a plurality of stripe-shaped pattern lights having the predetermined wavelength and having phases differing from each other to the target, and the controller performs the shape calculation on the basis of the phase shift method. In this configuration, even if the target has both the low-reflectivity area and the high-reflectivity area, it is possible to calculate the three-dimensional shape of the target properly on the basis of the phase shift method.

According to the present disclosure, even if a target has both a low-reflectivity area and a high-reflectivity area, it is possible to acquire accurate pixel values for both of these areas.

DETAILED DESCRIPTION

Figure 1:
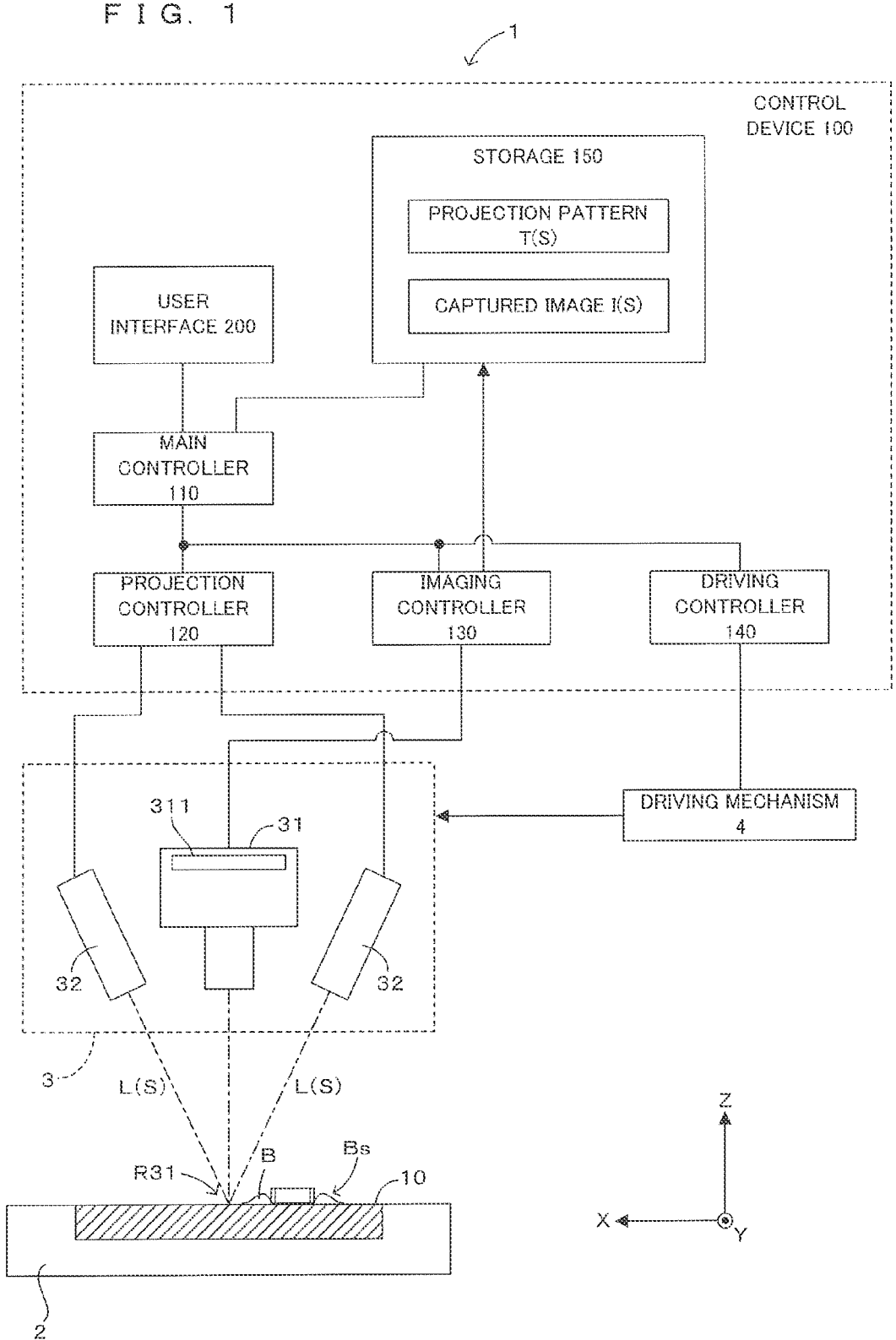
FIG. 1 is a block diagram schematically illustrating an appearance inspection apparatus according to the present disclosure.

FIG. 1 is a block diagram schematically illustrating an appearance inspection apparatus according to the present disclosure. FIG. 1 and the drawings following FIG. 1 show XYZ orthogonal coordinates, where necessary, defined by a Z direction parallel to the vertical direction, and an X direction and a Y direction parallel to the horizontal direction. An appearance inspection apparatus 1 in FIG. 1 makes a control device 100 control a transport conveyor 2, an inspection head 3, and a driving mechanism 4 to check whether solder B bonding a part (electronic part) to a board 10 (printed board) is a good or bad condition.

The transport conveyor 2 transports the board 10 along a predetermined transport path. More specifically, the transport conveyor 2 transports the board 10 to be inspected into an inspection position in the appearance inspection apparatus 1 and holds the board 10 horizontally at the inspection position. After inspection on the board 10 at the inspection position is finished, the transport conveyor 2 transports the inspected board 10 out of the appearance inspection apparatus 1.

The inspection head 3 includes an imaging camera 31 which images the interior of an imaging field of view V31 from above. The inspection head 3 puts the solder B on the board 10 transported into the inspection position in the imaging field of view V31 and images it by the imaging camera 31. The imaging camera 31 includes an imaging unit 311 of a flat-plat shape for imaging a reflected light from the solder B. The imaging unit 311 will be described later in detail using FIG. 2. The inspection head 3 further includes a projector 32 which projects a stripe-shaped pattern light L(S) having a light intensity distribution to change in a sine wave pattern onto the imaging field of view V31. The projector 32 includes a light source such as a light emitting diode (LED), and a digital micromirror device for reflecting a light from the light source toward the imaging field of view V31. The projector 32 adjusts the angle of each micromirror of the digital micromirror device to allow projection of pattern lights L(S) of two or more types having phases differing from each other onto the imaging field of view V31. Specifically, the inspection head 3 performs imaging using the imaging camera 31 while changing the phase of the patter light L(S) projected from the projector 32 to allow measurement of a three-dimensional shape Bs of the solder B within the imaging field of view V31 on the basis of the phase shift method.

The inspection head 3 includes eight projectors 32 (in FIG. 1, two representative projectors 32 are shown for simplification of illustration). The eight projectors 32 are arranged to surround the imaging camera 31 and arranged with an equal pitch in a circumferential pattern with respect to the vertical direction Z as a center. Each of the projectors 32 projects the pattern light L(S) from diagonally above onto the imaging field of view V31 of the imaging camera 31. This makes it possible to project the pattern light L(S) onto the imaging field of view V31 from one projector 32 having an appropriate positional relationship with the solder B among the projectors 32.

The driving mechanism 4 drives the inspection head 3 in the horizontal direction and the vertical direction using a motor while supporting the inspection head 3. In response to this driving by the driving mechanism 4, the inspection head 3 moves to a position above the solder B to allow the solder B to be caught within the imaging field of view V31, thereby allowing measurement of the three-dimensional shape Bs of the solder B within the imaging field of view V31.

The control device 100 includes a main controller 110 that is a processor having a central processing unit (CPU) and a memory. The main controller 110 controls each part of the device to perform the inspection. The control device 100 includes a user interface 200 having input-output equipment such as a display, a keyboard, and a mouse, and allows a user to input a command to the control device 100 and to check result of the inspection by the control device 100 through the user interface 200. The control device 100 further includes a projection controller 120 which controls the projector 32, an imaging controller 130 which controls the imaging camera 31, and a driving controller 140 which controls the driving mechanism 4. When the transport conveyor 2 transports the board 10 into the inspection position, the main controller 110 makes the driving controller 140 control the driving mechanism 4 to move the inspection head 3 to a position above the solder B on the board 10. By doing so, the solder B is brought within the imaging field of view V31 of the imaging camera 31.

Next, while the main controller 110 projects the pattern light L(S) from the projector 32 onto the imaging field of view V31 including the solder B, the main controller 110 makes the imaging camera 31 capture an image of the pattern light L(S) projected onto the imaging field of view V31 (pattern imaging motion). More specifically, the main controller 110 includes a storage 150 having a nonvolatile memory, and reads a projection pattern T(S) stored in the storage 150. Then, the main controller 110 controls the projection controller 120 on the basis of the projection pattern T(S) read from the storage 150, thereby adjusting the angle of each micromirror of the digital micromirror device of the projector 32 according to the projection pattern T(S). By doing so, the pattern light L(S) having the projection pattern T(S) is projected onto the imaging field of view V31. The main controller 110 further controls the imaging controller 130 to make the imaging camera 31 capture an image of the pattern light L(S) projected onto the imaging field of view V31, thereby acquiring a captured image I(S). The captured image I is stored into the storage 150. The storage 150 stores four types of projection patterns T(S) differing from each other in phase by 90 degrees. The pattern imaging motion is performed four times using the different projection patterns T(S) (S-1, 2, 3, 4). As a result, images of the pattern lights L(S) differing from each other in phase by 90 degrees are captured to acquire four types of captured images I(S).

On the basis of the four types of captured images I(S) acquired in this way, the main controller 110 determines the height of the imaging field of view V31 for each pixel of the imaging camera 31 on the basis of the phase shift method. By doing so, the height of a surface of the solder B is determined for each pixel of the imaging camera 31.

Figure 2:
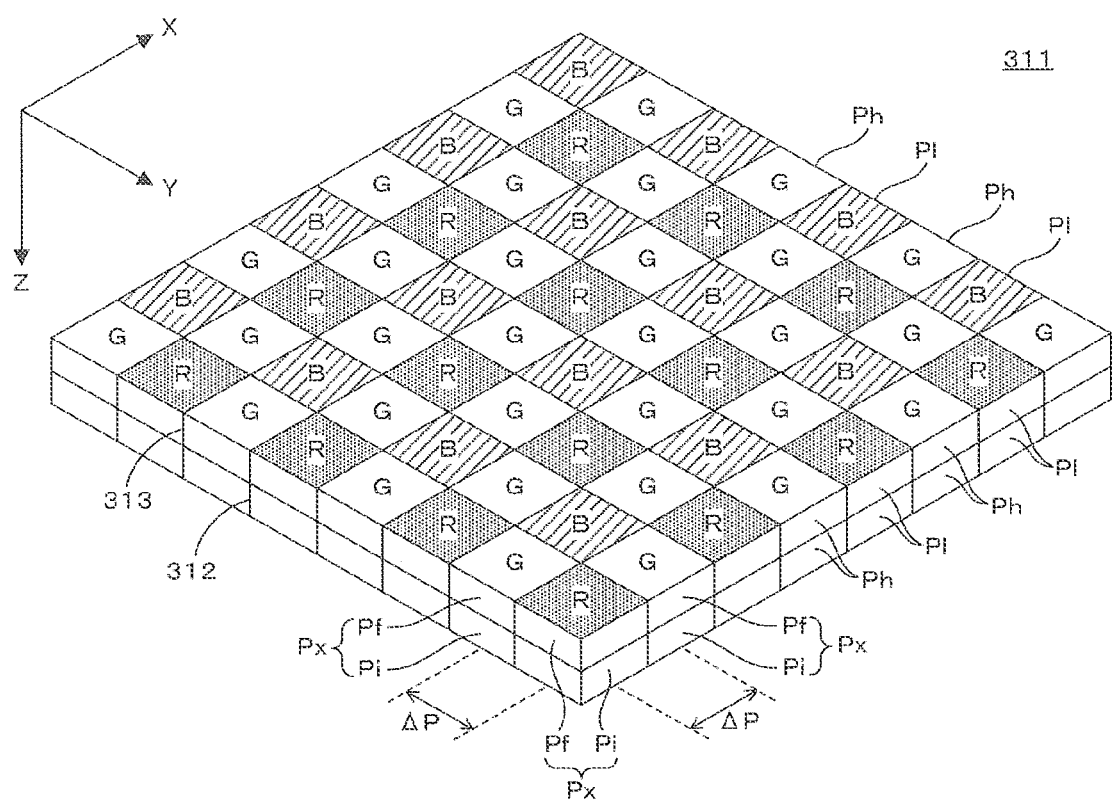
FIG. 2 schematically shows the configuration of the imaging unit.

FIG. 2 schematically shows the configuration of the imaging unit. The imaging unit 311 includes a solid state image sensor 312 such as a charge coupled device (CCD) image sensor, and a color filter 313 superimposed on the solid state image sensor 312. The solid state image sensor 312 includes a plurality of light-receiving pixels Pi arranged with a constant arrangement pitch $\Delta P$ in each of the X direction and the Y direction. Namely, in the solid state image sensor 312, the light-receiving pixels Pi are arranged two dimensionally. The color filter 313 includes a plurality of filter pixels Pf arranged with the constant arrangement pitch $\Delta P$ in each of the X direction and the Y direction. Namely, in the color filter 313, the filter pixels Pf are arranged two dimensionally.

In this way, the light-receiving pixels Pi and the filter pixels Pf are provided in one-to-one relationship with each other, and the light-receiving pixel Pi and the corresponding filter pixel Pf face each other. In other words, in the imaging unit 311, the light-receiving pixel Pi and the filter pixel Pf facing each other form a pixel Px, and pixels Px are arranged with the constant arrangement pitch $\Delta P$ in each of the X direction and the Y direction. In each of the pixels Px, the light-receiving pixel Pi outputs a pixel value V (FIG. 3) responsive to the intensity of light having transmitted the filter pixel Pf and having entered the light-receiving pixel Pi.

As shown in FIG. 2, in the color filter 313, the filter pixels Pf are arranged in the Bayer arrangement. Each of the filter pixels Pf permits transmission of light of a color corresponding to its arrangement position out of red (R), green (G), and blue (B), and restricts transmission of light of a color differing from the color corresponding to the arrangement position. For this reason, each pixel Px of the imaging unit 311 has a spectral sensitivity characteristic corresponding to the color of light permitted to transmit the filter pixel Pf of the pixel Px.

Figure 3:
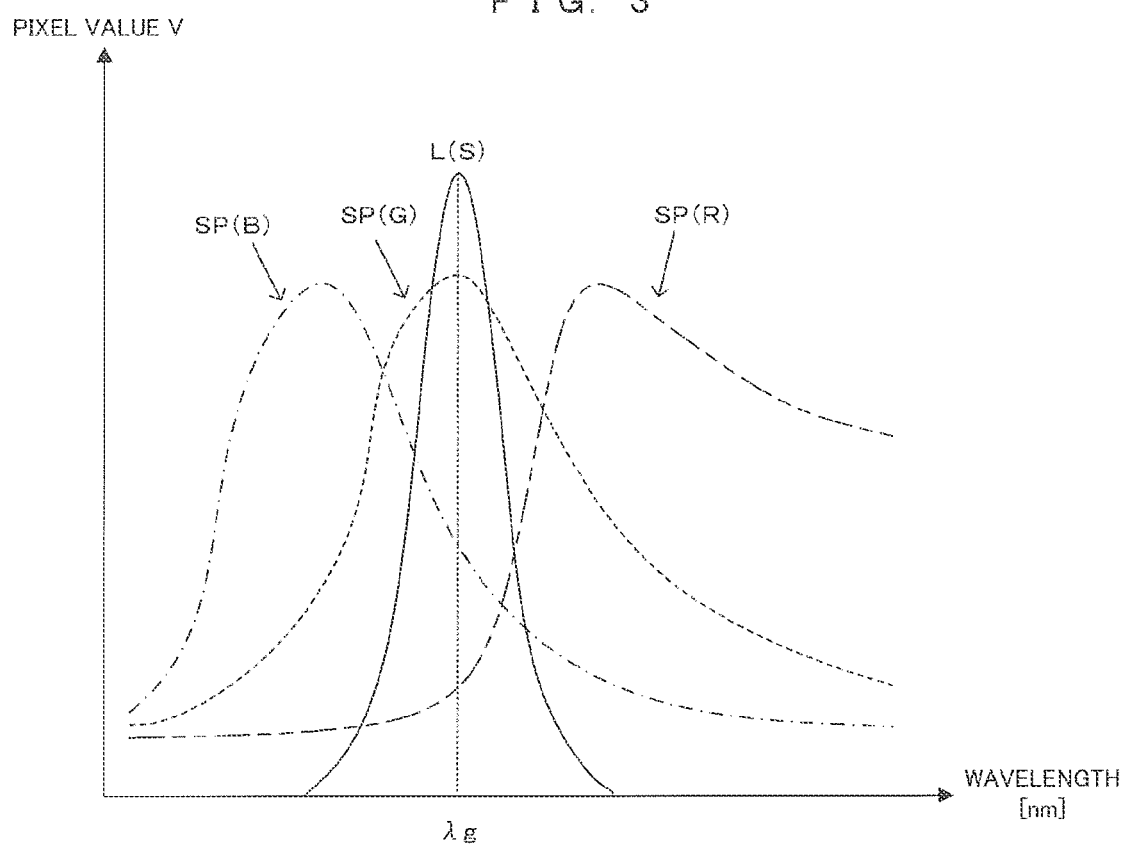
FIG. 3 schematically shows the spectral sensitivity characteristic of a pixel of the imaging unit.

FIG. 3 schematically shows the spectral sensitivity characteristic of a pixel of the imaging unit. In the graph of FIG. 3 with a horizontal axis showing a light wavelength and a vertical axis showing the pixel value V, an alternate long and two short dashes line indicates a spectral sensitivity characteristic SP(R) of a pixel Px with a filter pixel Pf permitting transmission of red (R) (hereinafter called a "red pixel Px," where appropriate), a dashed line indicates a spectral sensitivity characteristic SP(G) of a pixel Px with a filter pixel Pf permitting transmission of green (G) (hereinafter called a "green pixel Px," where appropriate), and an alternate dash and dot line indicates a spectral sensitivity characteristic SP(B) of a pixel Px with a filter pixel Pf permitting transmission of blue (B) (hereinafter called a "blue pixel Px," where appropriate). FIG. 3 further includes a solid line indicating the wavelength distribution of the pattern light L(S) projected from the projector 32.

Namely, in the embodiment, the pattern light L(S) has a wavelength distribution having a peak at a wavelength $\lambda g$ of green (in other words, has an emission spectrum of green). On the other hand, the green pixel Px has the spectral sensitivity characteristic SP(G) having high sensitivity to the wavelength $\lambda g$ of the pattern light L(S). The red pixel Px has the spectral sensitivity characteristic SP(R) having a peak at a longer wavelength than the wavelength $\lambda g$ and has lower sensitivity to the wavelength $\lambda g$ of the pattern light L(S) than the green pixel Px. The blue pixel Px has the spectral sensitivity characteristic SP(B) having a peak at a shorter wavelength than the wavelength $\lambda g$ and has lower sensitivity to the wavelength $\lambda g$ of the pattern light L(S) than the green pixel Px.

Specifically, as shown in FIG. 2, out of the pixels Px of the imaging unit 311, the green pixel Px functions as a high-sensitivity pixel Ph exhibiting high sensitivity to the wavelength λg, and each of the red pixel Px and the blue pixel Px functions as a low-sensitivity pixel Pl exhibiting lower sensitivity to the wavelength λg than the high-sensitivity pixel Ph. The high-sensitivity pixels Ph (green pixels Px) and the low-sensitivity pixels Pl (red pixels Px) are aligned alternately in the Y direction. The high-sensitivity pixels Ph (green pixels Px) and the low-sensitivity pixels Pl (blue pixels Px) are aligned alternately in the X direction. By doing so, the low-sensitivity pixels Pl (red pixels Px) adjoin the high-sensitivity pixel Ph (green pixel Px) from both sides in the Y direction, and the low-sensitivity pixels Pl (blue pixels Px) adjoin the high-sensitivity pixel Ph (green pixel Px) from both sides in the X direction. In other words, the low-sensitivity pixels Pl adjoin the high-sensitivity pixel Ph from the four directions, and the high-sensitivity pixels Ph adjoin the low-sensitivity pixel Pl from the four directions. Adjoining of the pixels Px mentioned herein means that focused two pixels Px are arranged with the arrangement pitch ΔP.

Figure 4:
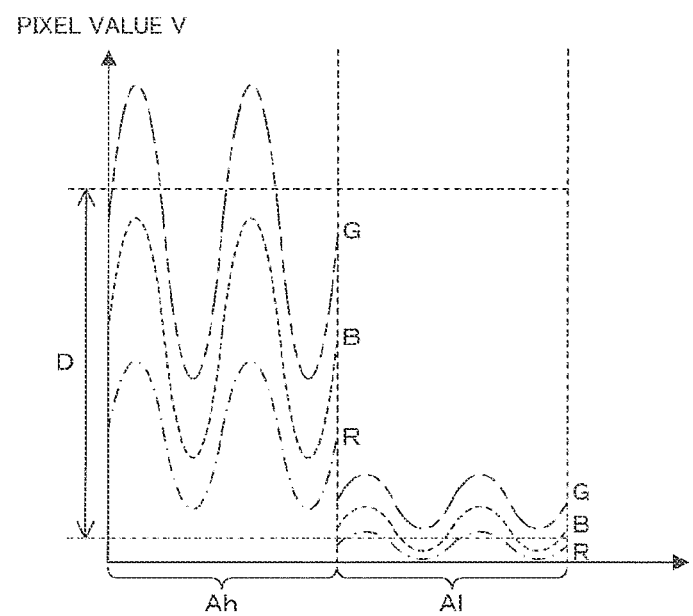
FIG. 4 schematically shows a relationship between a light reflected in each of the high-reflection area and the low-reflection area and a pixel value.

As shown in FIG. 4, this configuration makes it possible to convert both a light reflected in a high-reflection area Ah having high reflectivity in a surface of the solder B and a light reflected in a low-reflection area Al having low reflectivity in the surface of the solder B to accurate pixel values V using the pixels Px.

FIG. 4 schematically shows a relationship between a light reflected in each of the high-reflection area and the low-reflection area and a pixel value. FIG. 4 schematically shows the pixel values V output from the red (R), green (G), and blue (B) pixels Px when the pattern light L(S) as a sine wave is projected onto each of the high-reflection area Ah and the low-reflection area Al and a light reflected in each of the areas Ah and Al is detected by these pixels Px. The waveform of the pixel value V is actually imperfect as the pixel value V output from the pixel Px cannot be a value out of a dynamic range D. However, this waveform is illustrated as a perfect waveform in the drawing.

The pixel value V output from the green G pixel Px (high-sensitivity pixel Ph) having detected the pattern light L(S) reflected in the high-reflection area Ah partially exceeds an upper limit of the dynamic range D of the pixel Px (in other words, the dynamic range D of the light-receiving pixel Pi). This prohibits the green pixel Px from converting the pattern light L(S) reflected in the high-reflection area Ah to an accurate pixel value V. By contrast, the pixel values V output from the red (R) and blue (B) pixels Px (low-sensitivity pixels Pl) reflected in the high-reflection area Ah fall within the dynamic range D of the pixel Px. This allows the red (R) or blue (B) pixel Px to convert the pattern light L(S) reflected in the high-reflection area Ah to an accurate pixel value V.

The pixel values V output from the red (R) and blue (B) pixels Px (low-sensitivity pixels Pl) having detected the pattern light L(S) reflected in the low-reflection area Al partially exceed a lower limit of the dynamic range D of the pixel Px. This prohibits the red (R) and blue (B) pixels Px from converting the pattern light L(S) reflected in the low-reflection area Al to accurate pixel values V. By contrast, the pixel value V output from the green (G) pixel Px (high-sensitivity pixels Ph) reflected in the low-reflection area Al falls within the dynamic range D of the pixel Px. This allows the green (G) pixel Px to convert the pattern light L(S) reflected in the low-reflection area Al to an accurate pixel value V.

Namely, the pattern light L(S) reflected in the high-reflection area Ah can be converted to accurate pixel values V by the red (R) and blue (B) pixels Px (low-sensitivity pixels Pl), and the pattern light L(S) reflected in the low-reflection area Al can be converted to an accurate pixel value V by the green (G) pixel Px (high-sensitivity pixel Ph).

Figure 5:
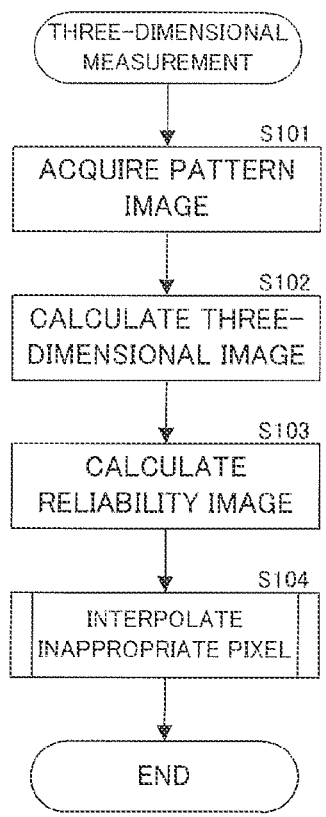
FIG. 5 is a flowchart showing an example of the three-dimensional measurement performed by the appearance inspection apparatus.
Figure 6:
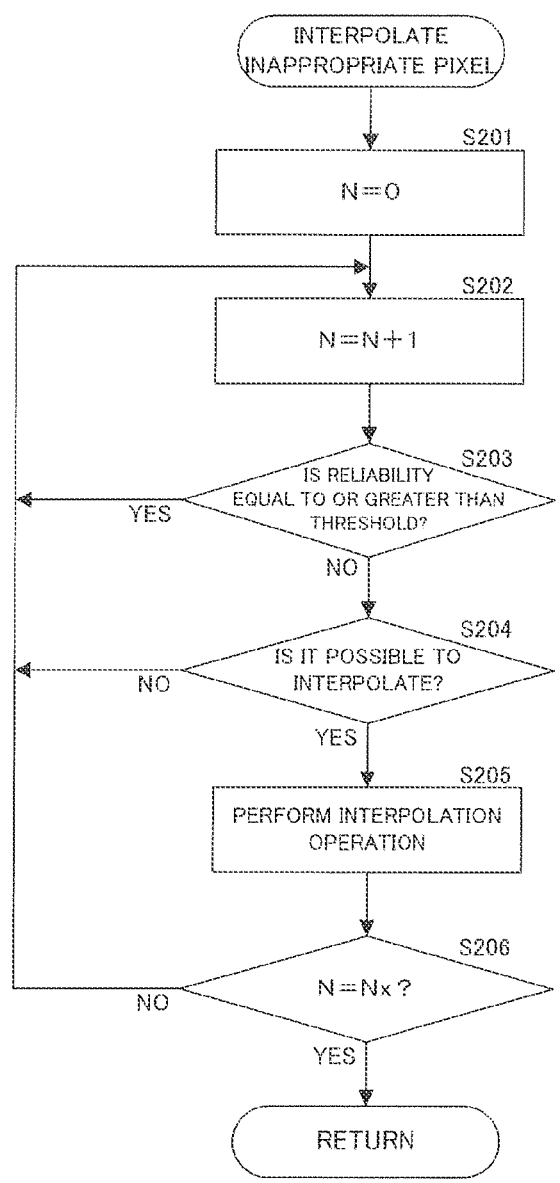
FIG. 6 is a flowchart showing an example of interpolation of an inappropriate pixel performed in the three-dimensional measurement shown in FIG. 5.
Figure 7:
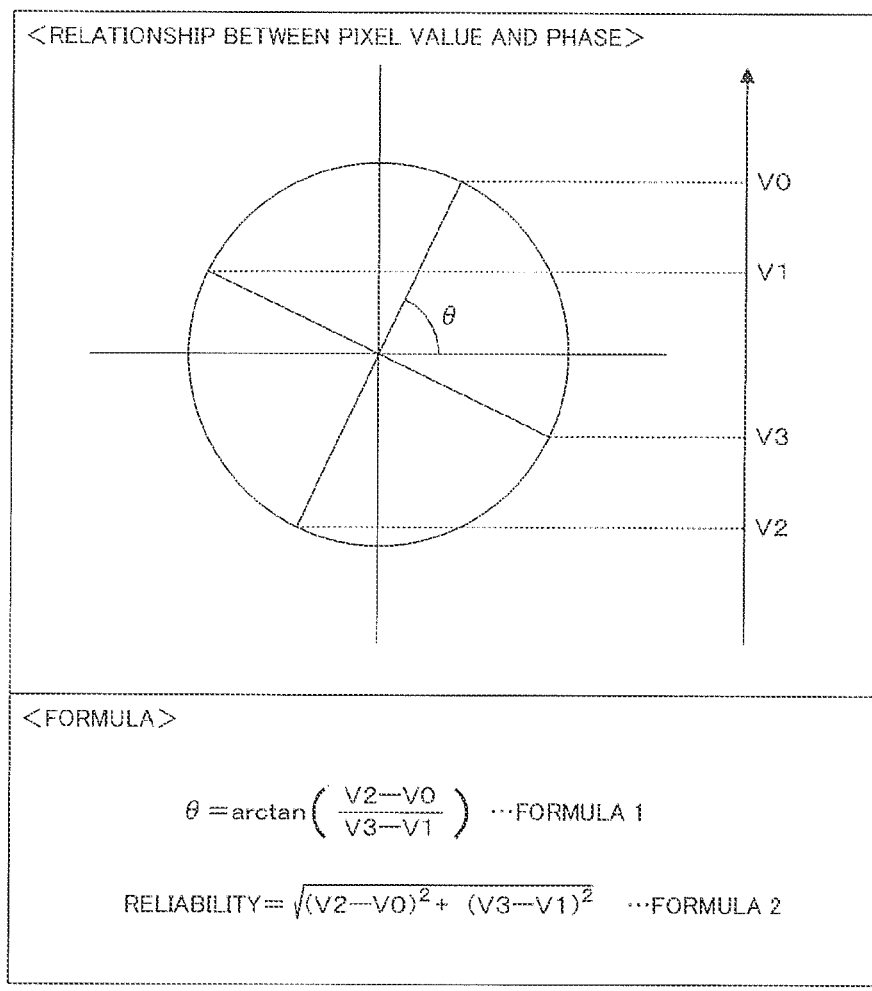
FIG. 7 shows the detail of operation performed in the three-dimensional measurement shown in FIG. 5.

FIG. 5 is a flowchart showing an example of the three-dimensional measurement performed by the appearance inspection apparatus. FIG. 6 is a flowchart showing an example of interpolation of an inappropriate pixel performed in the three-dimensional measurement shown in FIG. 5. FIG. 7 shows the detail of operation performed in the three-dimensional measurement shown in FIG. 5. FIGS. 5 and 6 are performed under control by the main controller 110.

In step S101, the pattern imaging motion of imaging the pattern light L(S) using the imaging camera 31 while projecting the pattern light L(S) onto the solder B is performed repeatedly while changing the phase of the pattern light L(S) by 90 degrees for each implementation of the pattern imaging motions, thereby acquiring four captured images I(S) differing from each other in phase by 90 degrees (S=1, 2, 3, 4).

In step S102, on the basis of the phase shift method, the main controller 110 calculates a three-dimensional image indicating the three-dimensional shape Bs of the solder B from the acquired captured images I(S). More specifically, on the basis of a formula 1 shown in FIG. 7, the three-dimensional image is acquired by performing operation of determining an angle θ using pixel values V0 to V3 of the four captured images I(S) for each of the pixels Px.

In step S103, the main controller 110 calculates a reliability image indicating the reliability of the pixel value V about each of the pixels Px. This reliability shows whether the pixel value V of the pixel Px falls within the dynamic range D. Specifically, if the pixel value V of the pixel Px is excessive bright or excessive dark, reliability is reduced. More specifically, operation of determining reliability using the pixel values V0 to V3 of the four captured images I(S) on the basis of a formula 2 shown in FIG. 7, is performed on each of the pixels Px, thereby acquiring the reliability image. If the pixel values V0 to V3 include a saturated pixel value (namely, a pixel value indicating "255" in the 8-bit expression), the reliability of the pixel value V is determined to be "0" irrespective of the formula 2 in FIG. 2.

In step S104, interpolation of an inappropriate pixel shown in FIG. 6 is performed. In step S201, a count value N for identifying the pixels Px is reset to zero. In step S202, the count value N is incremented. Then, a judgment is made as to whether the reliability of the pixel value V of the pixel Px having the count value N is equal to or greater than a threshold (step S203). If the reliability is equal to or greater than the threshold (if "YES" in step S203), the flow returns to step S202 and the count value N is incremented.

If the reliability is less than the threshold (if "NO" in step S203), a judgment is made as to whether the pixel value V of an inappropriate pixel can be interpolated using the pixel values V of pixels Px existing within the arrangement pitch ΔP from the pixel Px (inappropriate pixel) having the incremented count value N, namely, using the pixel values V of four pixels Px adjoining the inappropriate pixel (step S204). More specifically, if these four pixels Px include a pixel Px having reliability of less than the threshold, the interpolation is judged to be impossible. If all the pixel values V of these four pixels Px have reliabilities of equal to or greater than the threshold, the interpolation is judged to be possible.

If the interpolation is impossible (if "NO" in step S204), the flow returns to step S202 and the count value N is incremented. If the interpolation is possible (if "YES" in step S204), interpolation operation is performed to interpolate the pixel value V of the inappropriate pixel using the pixel values V of the four pixels Px adjoining the corresponding inappropriate pixel (step S205). Namely, the pixel value V0 of the target pixel Px is interpolated using the pixel values V0 of the four adjoining pixels Px. The interpolation is performed in the same way for each of the pixel values V1 to V3. Such interpolation operation is executable using a well-known interpolation method such as linear interpolation or polynomial interpolation. In step S205, the angle θ is calculated using the interpolated pixel values V (V0 to V3) according to the formula 1 in FIG. 7, and the calculated angle θ is adopted as the corresponding pixel Px in the three-dimensional image calculated in step S102 (namely, the pixel Px subjected to the interpolation in step S205). Steps S202 to S205 are performed until the count value N reaches a maximum (until "YES" is given in step S206).

According to the foregoing embodiment, the imaging camera 31 includes the high-sensitivity pixel Ph with the spectral sensitivity characteristic SP(G) having high sensitivity to a light of the wavelength λg to be irradiated to the solder B (target), and the low-sensitivity pixel Pl with the spectral sensitivity characteristic SP(R) or SP(B) having low sensitivity to this light. This allows the pattern light L(S) reflected in the high-reflection area Ah of the surface of the solder B to be converted to an appropriate pixel value V using the low-sensitivity pixel Pl, while allowing the pattern light L(S) reflected in the low-reflection area Al of the surface of the solder B to be converted to an appropriate pixel value V using the high-sensitivity pixel Ph. Namely, both the pattern lights L(S) reflected in the high-reflection area Ah and the low-sensitivity pixel Pl can be converted to appropriate pixel values V. In this way, even if the solder B has both the high-reflection area Ah and the low-sensitivity pixel Pl, acquisition of accurate pixel values V is allowed for both of these areas Ah and Al.

The high-sensitivity pixels Ph and the low-sensitivity pixels Pl are arranged alternately. In this configuration, the high-sensitivity pixels Ph and the low-sensitivity pixels Pl are arranged uniformly while adjoining each other. This allows the pattern light L(S) reflected in the high-reflection area Ah to be captured correctly using the low-sensitivity pixel Pl, while allowing the pattern light L(S) reflected in the low-reflection area Al to be captured correctly using the high-sensitivity pixel Ph. As a result, even if the solder B has both the high-reflection area Ah and the low-sensitivity pixel Pl, acquisition of accurate pixel values V is allowed for both of these areas Ah and Al.

The high-sensitivity pixels Ph and the low-sensitivity pixels Pl are included at the same ratio. This configuration allows the pattern light L(S) reflected in the high-reflection area Ah and the pattern light L(S) reflected in the low-reflection area Al to be converted to appropriate pixel values V without causing unbalance toward one of these pattern lights L(S). As a result, even if the solder B has both the high-reflection area Ah and the low-sensitivity pixel Pl, acquisition of accurate pixel values V is allowed for both of these areas Ah and Al.

The wavelength λg is a wavelength of green, and the pixels Px are arranged in the Bayer arrangement. Each of the high-sensitivity pixels Ph is the green pixel Px in the Bayer arrangement, and the low-sensitivity pixels Pl include an equal number of the blue pixels Px and the red pixels Px in the Bayer arrangement. In this configuration, the green high-sensitivity pixels Ph and the red or blue low-sensitivity pixels Pl are arranged uniformly while adjoining each other. This allows the pattern light L(S) reflected in the high-reflection area Ah to be captured correctly using the low-sensitivity pixel Pl, while allowing the pattern light L(S) reflected in the low-reflection area Al to be captured correctly using the high-sensitivity pixel Ph. As a result, even if the solder B has both the high-reflection area Ah and the low-sensitivity pixel Pl, acquisition of accurate pixel values V is allowed for both of these areas Ah and Al.

It is highly likely that the pixel value V resulting from conversion of the pattern light L(S) having entered the high-sensitivity pixel Ph after being reflected in the high-reflection area Ah or the pixel value V resulting from conversion of the pattern light L(S) having entered the low-sensitivity pixel Pl after being reflected in the low-reflection area Al will become an inappropriate value. In this regard, the main controller 110 performs a judgment process (step S203) on each of the pixels Px for judging whether the pixel value V output from the pixel Px is appropriate on the basis of the pixel value V. Then, shape calculation is performed (step S205) on the basis of a result of the judgment in the judgment process (step S203). This configuration makes it possible to perform the shape calculation using an appropriate pixel value V while reducing influence by an inappropriate pixel value V (steps S102, S205). Thus, even if the solder B has both the high-reflection area Ah and the low-sensitivity pixel Pl, it is possible to calculate the three-dimensional shape Bs of the solder B accurately.

The main controller 110 performs the shape calculation (steps S102, S205) on the basis of a result of interpolation performed on the high-sensitivity pixel Ph, which has the solder B judged to be inappropriate by the judgment process (step S203), using the pixel value V of the low-sensitivity pixel Pl existing within the range of the arrangement pitch ΔP from the corresponding high-sensitivity pixel Ph, or on the basis of a result of interpolation performed on the low-sensitivity pixel Pl, which has the pixel value V judged to be inappropriate by the judgment process (step S203), using the pixel value V of the high-sensitivity pixel Ph existing within the range of the arrangement pitch ΔP from the corresponding low-sensitivity pixel Pl. This configuration allows implementation of the shape calculation (steps S102, S205) on the basis of a result of interpolation of the pixel value V of an inappropriate pixel Px judged to be inappropriate by the judgment process (step S203) using the pixel value V of the pixel Px existing within the range of the arrangement pitch ΔP from the corresponding inappropriate pixel Px. Thus, even if the solder B has both the high-reflection area Ah and the low-reflection area Al, it is possible to calculate the three-dimensional shape Bs of the solder B accurately.

The projector 32 irradiates the pattern lights L(S) of the four projection patterns T(S) having the wavelength λg and having phases differing from each other to the solder B. The main controller 110 performs the shape calculation on the basis of the phase shift method (steps S102, S205). In this configuration, even if the solder B has both the high-reflection area Ah and the low-reflection area Al, it is possible to calculate the three-dimensional shape Bs of the solder B properly on the basis of the phase shift method.

As described above, according to the embodiment, the appearance inspection apparatus 1 corresponds to an example of a "three-dimensional measuring apparatus" of the present disclosure, the projector 32 corresponds to an example of a "projector" of the present disclosure, the imaging camera 31 corresponds to an example of an "imaging camera" of the present disclosure, the control device 100 corresponds to an example of a "controller" of the present disclosure, the pattern light L(S) corresponds to an example of a "light" of the present disclosure, the projection pattern T(S) corresponds to an example of a "stripe pattern" of the present disclosure, the wavelength λg corresponds to an example of a "predetermined wavelength" of the present disclosure, the solder B corresponds to an example of a "target" of the present disclosure, the three-dimensional shape Bs corresponds to an example of a "three-dimensional shape" of the present disclosure, the pixel Px corresponds to an example of a "pixel" of the present disclosure, the high-sensitivity pixel Ph corresponds to an example of a "high-sensitivity pixel" of the present disclosure, the low-sensitivity pixel Pl corresponds to an example of a "low-sensitivity pixel" of the present disclosure, the arrangement pitch ΔP corresponds to an example of a "predetermined range" of the present disclosure, the spectral sensitivity characteristics SP(R), SP(B), and SP(G) correspond to an example of a "spectral sensitivity characteristic" of the present disclosure, the pixel value V corresponds to an example of a "pixel value" of the present disclosure, and step S203 corresponds to an example of a "judgment process" of the present disclosure.

The present disclosure is not limited to the foregoing embodiment but various changes can be added to the foregoing within a range not deviating from the purport of the disclosure. For example, the pixels Px are not always required to be arranged in the Bayer arrangement. The blue (B) pixels in the arrangement may be replaced with the red (R) pixels, for example. In this case, the projector 32 may project the pattern light L(S) having a wavelength of red (R). Alternatively, the red (R) pixels in the arrangement may be replaced with the blue (B) pixels. In this case, the projector 32 may project the pattern light L(S) having a wavelength of blue (G).

The ratio between the number of the high-sensitivity pixels Ph and that of the low-sensitivity pixels Pl, the arrangement pattern, etc. are changeable, where appropriate.

Figure 8:
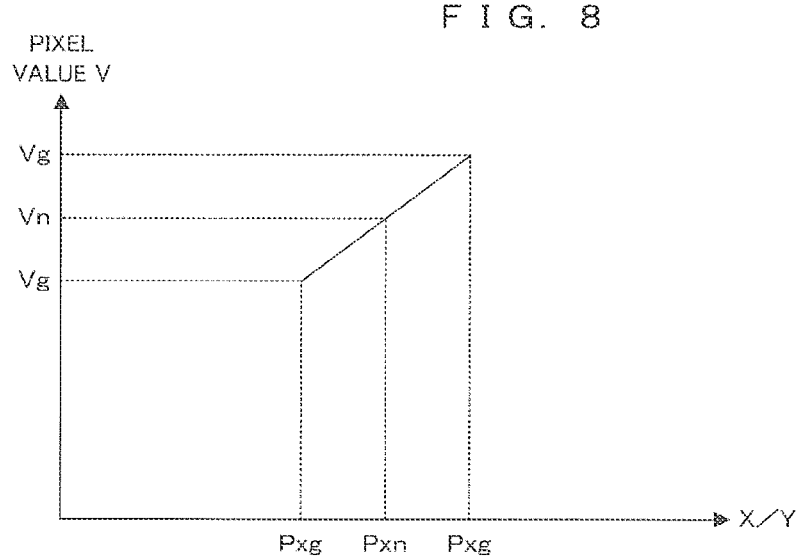
FIG. 8 shows an example of interpolation of an inappropriate pixel.

In step S204 described above, a specific technique of judging the possibility of interpolation is not limited to the foregoing exemplary technique. More specifically, regarding a pair of two pixels Px aligned in the X direction across an inappropriate pixel and a pair of two pixels Px aligned in the Y direction across the inappropriate pixel, if the reliabilities of the two pixels Px forming one of these pairs are equal to or greater than a threshold, namely, if these reliabilities are effective, interpolation may be judged to be possible. In this example, the interpolation operation in step S205 may be performed as follows. In the presence of only one pair having effective reliability, the pixel value V of the inappropriate pixel is interpolated using an average of the pixel values V of the two pixels Px forming this pair. In the presence of two pairs having effective reliabilities, the pixel value V of the inappropriate pixel is interpolated using an average of the pixel values V of the two pixels Px forming one of these two pairs in which an absolute value of a difference (brightness difference) between the pixel values V of the two pixels Px forming the pair is smaller than in the other pair. FIG. 8 shows an example of interpolation of an inappropriate pixel. As shown in FIG. 8, a pixel value Vn of an inappropriate pixel Pxn can be interpolated using an average of pixel values Vg of two pixels Pxg arranged to hold the inappropriate pixel Pxn therebetween (linear interpolation). Even if an inappropriate pixel exists at a boundary between the high-reflection area Ah and the low-reflection area Al, these techniques make it possible to reduce error in the interpolated pixel value V. As described above, the interpolation operation is not limited to the linear interpolation described here as an example but can be performed using other well-known interpolation methods.

In the foregoing example, interpolation is performed on the pixel value V of the pixel Px in the captured image I(S) resulting from imaging of the pattern light L(S). However, interpolation may be performed on the angle θ of each pixel Px calculated from the pixel values V0 to V3 of the four captured images I(S). Alternatively, interpolation may be performed on the height of each pixel Px calculated from the angle θ. In this way, the three-dimensional shape of the solder B can be calculated while an inappropriate pixel is interpolated on the basis of the pixel value V having reliability of equal to or greater than a threshold.

A method of calculating reliability is not limited to the foregoing example. For example, reliability may be calculated using the method disclosed in Japanese Patent Application Laid-Open No. 2014-119442 or Japanese Patent Publication No. 3996560.

A target of the three-dimensional measurement is not limited to the solder B.

What is claimed is:

1. A three-dimensional measuring apparatus comprising:
   a projector configured to irradiate a light of a predetermined wavelength to a target;
   an imaging camera having a plurality of pixels to which a light reflected on the target is incident, each of the pixels outputting a pixel value corresponding to an intensity of the light incident; and
   a controller configured to perform shape calculation of a three-dimensional shape of the target on a basis of the pixel value, wherein
   the pixels include a plurality of high-sensitivity pixels and a plurality of low-sensitivity pixels having a spectral sensitivity characteristic having a lower ratio of output to input of the predetermined wavelength than a spectral sensitivity characteristic of the high-sensitivity pixels,
   the high-sensitivity pixels and the low-sensitivity pixels are arranged alternately,
   the pixels include the high-sensitivity pixels and the low-sensitivity pixels at the same ratio,
   the predetermined wavelength is a wavelength of green,
   the pixels are arranged in a Bayer arrangement in which red, green, and blue pixels are arranged in a predetermined pattern,
   each of the high-sensitivity pixels is the green pixel in the Bayer arrangement,
   the low-sensitivity pixels include an equal number of the blue pixels and the red pixels in the Bayer arrangement, and
   the controller is configured to perform the shape calculation of a three-dimensional shape of the target on a basis of the pixel value of the high-sensitivity pixels having detected the light of the predetermined wavelength and the pixel value of the low-sensitivity pixels having detected the light of the predetermined wavelength.

2. The three-dimensional measuring apparatus according to claim 1, wherein
   the controller is configured to perform a judgment process of judging whether the pixel value output from the pixel is appropriate on a basis of the pixel value for each of the pixels, and is configured to perform the shape calculation on a basis of a judgment result obtained by the judgment process.

3. The three-dimensional measuring apparatus according to claim 2, wherein
the controller is configured to perform the shape calculation on a basis of a result of interpolation performed on the high-sensitivity pixel which has the pixel value judged to be inappropriate by the judgment process, using the pixel value of the low-sensitivity pixel existing within a predetermined range from the corresponding high-sensitivity pixel, or on a basis of a result of interpolation performed on the low-sensitivity pixel, which has the pixel value judged to be inappropriate by the judgment process, using the pixel value of the high-sensitivity pixel existing within the predetermined range from the corresponding low-sensitivity pixel.

4. The three-dimensional measuring apparatus according to claim 3, wherein
the projector is configured to irradiate a plurality of stripe-shaped pattern lights having the predetermined wavelength and having phases differing from each other to the target, and
the controller is configured to perform the shape calculation on a basis of a phase shift method.

5. The three-dimensional measuring apparatus according to claim 2, wherein
the projector is configured to irradiate a plurality of stripe-shaped pattern lights having the predetermined wavelength and having phases differing from each other to the target, and
the controller is configured to perform the shape calculation on a basis of a phase shift method.

6. The three-dimensional measuring apparatus according to claim 1, wherein
the projector is configured to irradiate a plurality of stripe-shaped pattern lights having the predetermined wavelength and having phases differing from each other to the target, and
the controller is configured to perform the shape calculation on a basis of a phase shift method.

7. A three-dimensional measuring method comprising:
irradiating a light of a predetermined wavelength to a target;
causing a light reflected on the target to be incident to a plurality of pixels and causing each of the pixels to output a pixel value corresponding to an intensity of the light incident; and
performing shape calculation of the three-dimensional shape of the target on a basis of the pixel value, wherein
the pixels includes a plurality of high-sensitivity pixels and a plurality of low-sensitivity pixels having a spectral sensitivity characteristic having a lower ratio of output to input of the predetermined wavelength than a spectral sensitivity characteristic of the high-sensitivity pixels,
the high-sensitivity pixels and the low-sensitivity pixels are arranged alternately,
the pixels include the high-sensitivity pixels and the low-sensitivity pixels at the same ratio,
the predetermined wavelength is a wavelength of green,
the pixels are arranged in a Bayer arrangement in which red, green, and blue pixels are arranged in a predetermined pattern,
each of the high-sensitivity pixels is the green pixel in the Bayer arrangement,
the low-sensitivity pixels include an equal number of the blue pixels and the red pixels in the Bayer arrangement, and
the shape calculation of a three-dimensional shape of the target is performed on a basis of the pixel value of the high-sensitivity pixels having detected the light of the predetermined wavelength and the pixel value of the low-sensitivity pixels having detected the light of the predetermined wavelength.

* * * * *